J. R. HALL.
Improvement in Machines for Sawing Shingles.

No. 132,575.  
Patented Oct. 29, 1872.

5 Sheets--Sheet 1.

Witnesses  
Geo. D. Beck  
A. F. Cornell

Inventor  
J. R. Hall.  
Per Burridge & Co.  
Attys.

J. R. HALL.

Improvement in Machines for Sawing Shingles.

No. 132,575. Patented Oct. 29, 1872.

5 Sheets--Sheet 4.

J. R. HALL.

Improvement in Machines for Sawing Shingles.

Figure 4:
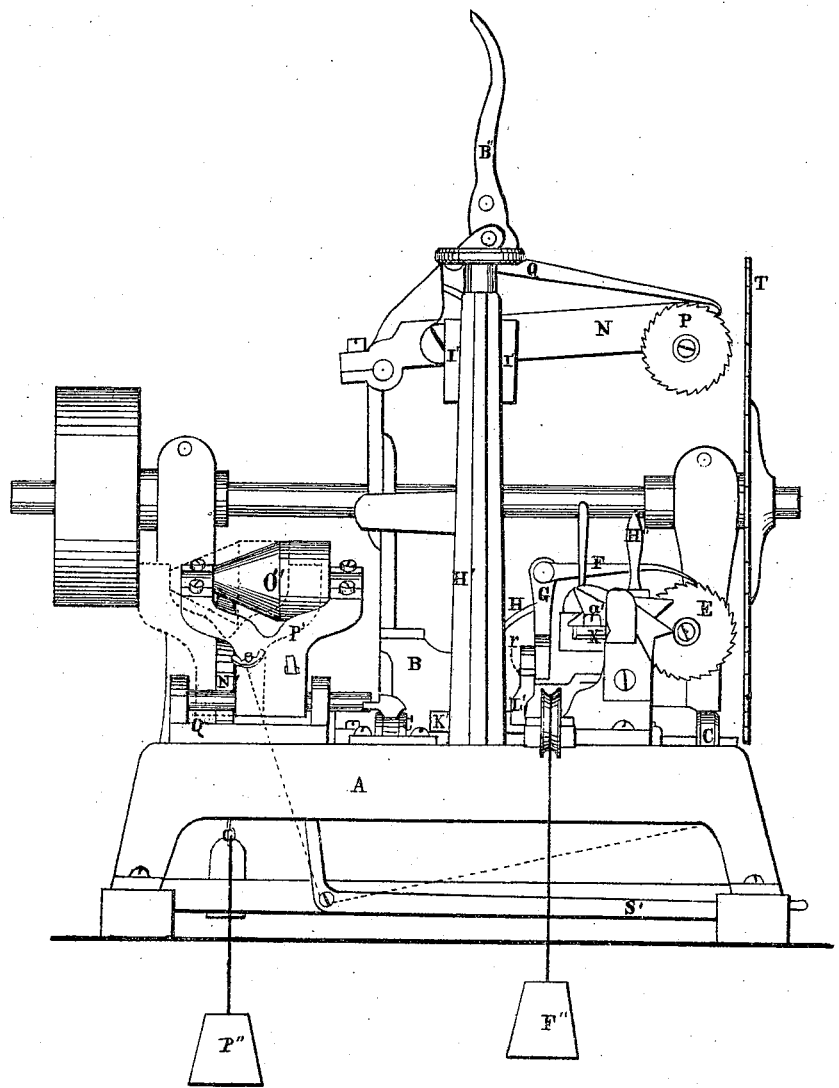

No. 132,575.  *Fig. 4.*  Patented Oct. 29, 1872.

Witnesses
Geo. D. Beck,
A. F. Cornell.

Inventor
J. R. Hall.
Per. Burridge & Co.
Attys.

J. R. HALL.

Improvement in Machines for Sawing Shingles.

No. 132,575.  Patented Oct. 29, 1872.

Witnesses.
Geo. S. Beck
A. F. Hornell.

Inventor
J. R. Hall.
Per Burridge & Co.
Attys.

UNITED STATES PATENT OFFICE

JERRY R. HALL, OF SALEM, OHIO.

IMPROVEMENT IN MACHINES FOR SAWING SHINGLES.

Specification forming part of Letters Patent No. 132,575, dated October 29, 1872.

*To all whom it may concern:*

Figure 1:
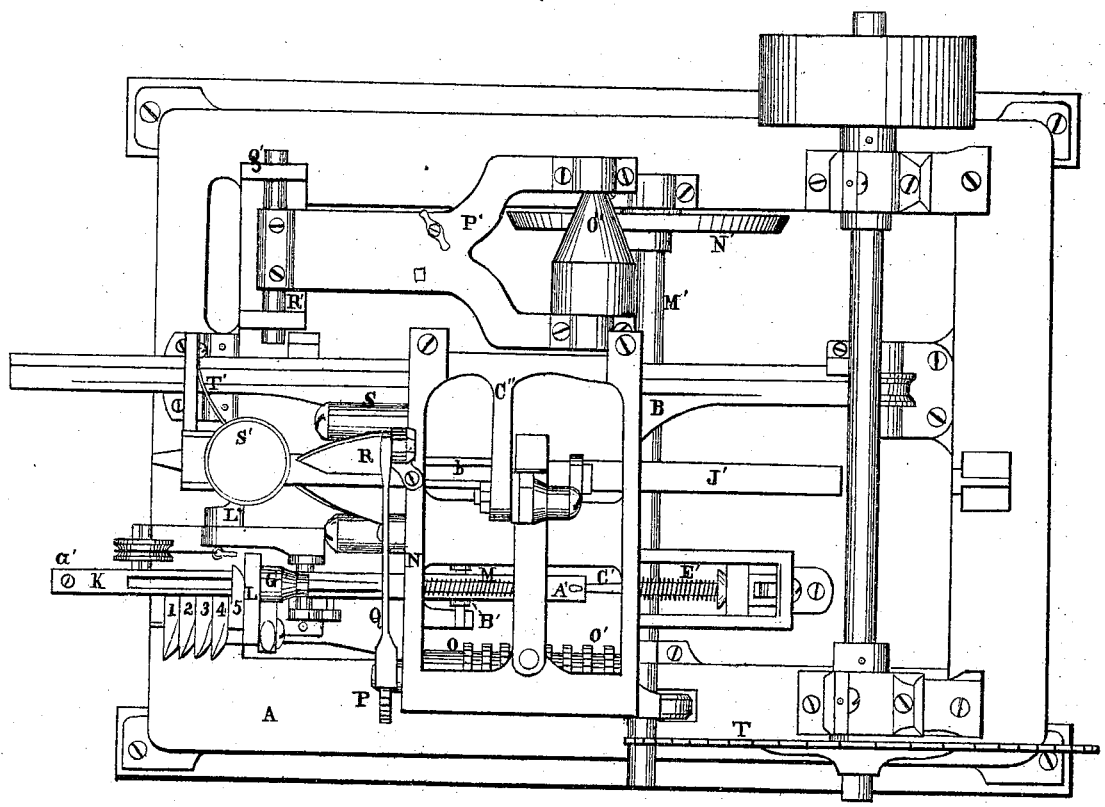
Figure 2:
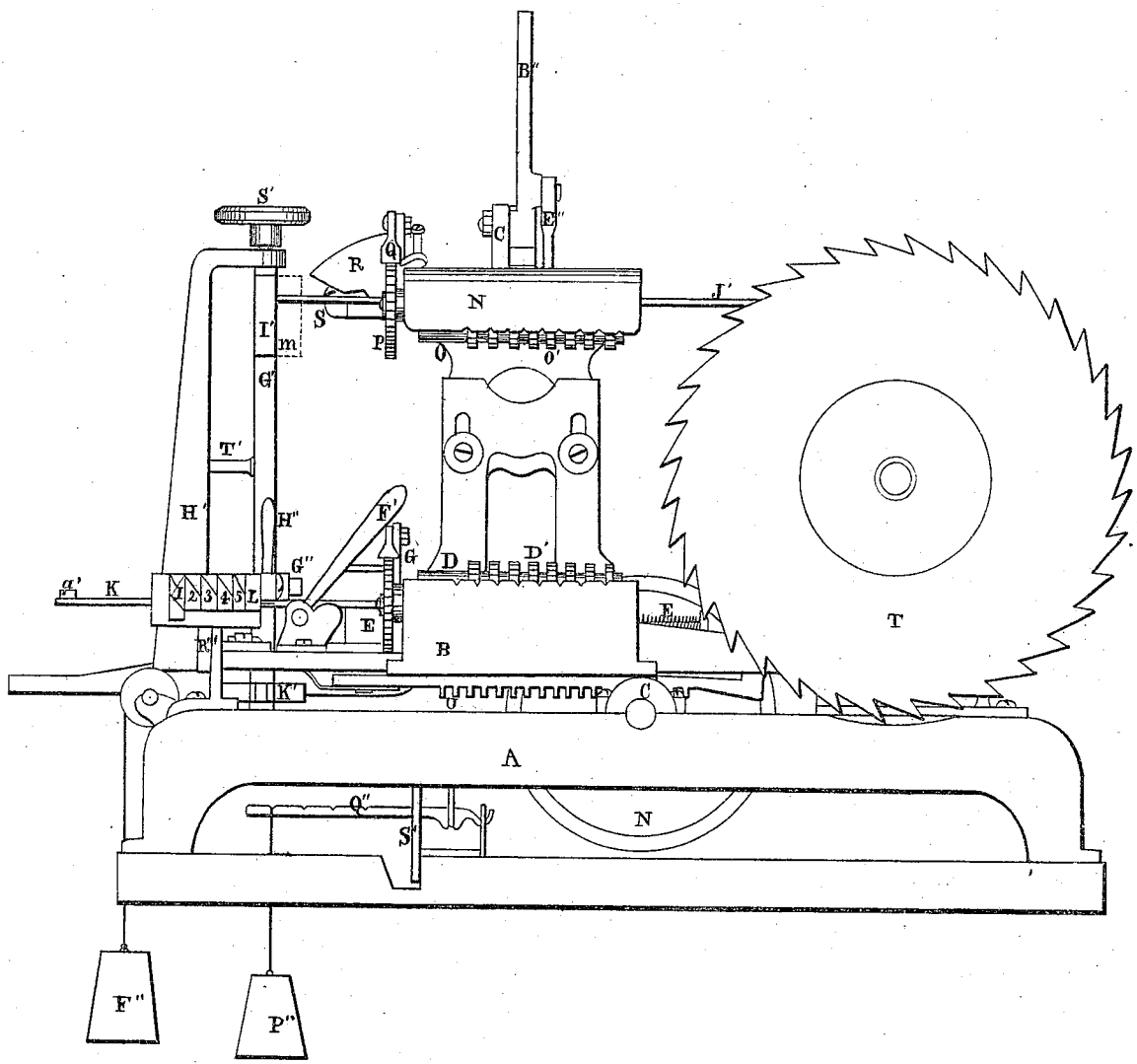
Figure 3:
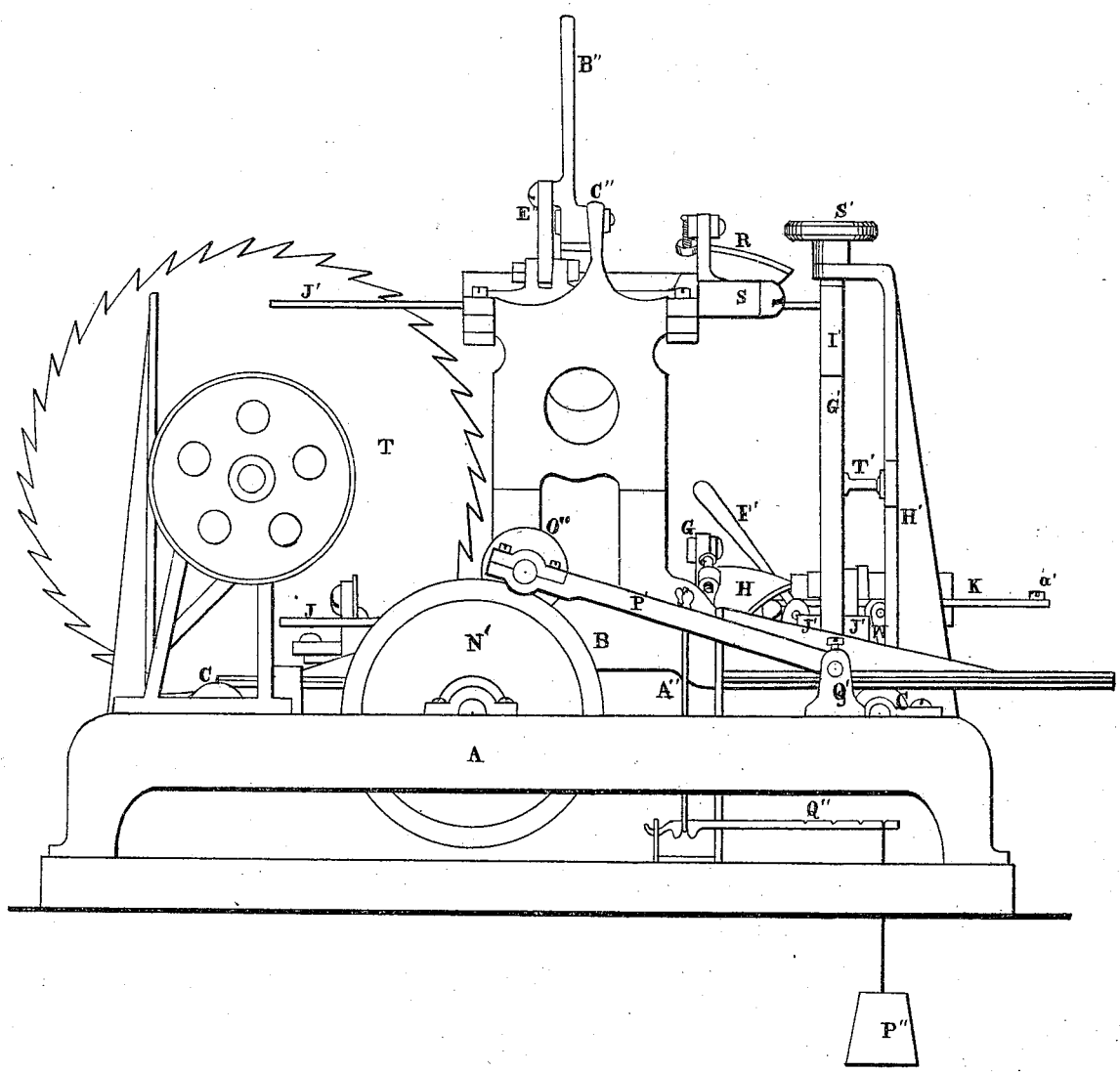
Figure 5:
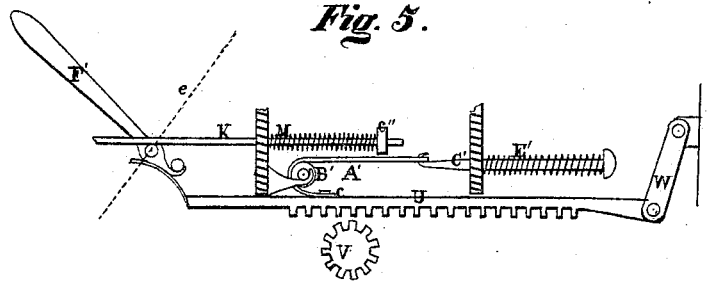
Figure 6:
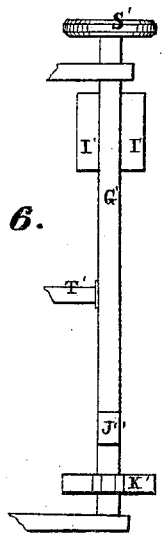
Figure 7:
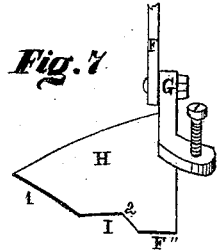

Be it known that I, JERRY R. HALL, of Salem, in the county of Columbiana and State of Ohio, have invented an Improvement in Machines for Sawing Shingles, of which the following is a description:

Figure 1 is a plan view of the machine. Fig. 2 is a side elevation. Fig. 3 is a view of the opposite side of Fig. 2. Fig. 4 is an end elevation. Figs. 5, 6, and 7 are detached sections.

Like letters of reference refer to like parts in the different views.

The nature of this invention relates to a machine for sawing shingles; and the object thereof is to saw the shingles from the bolt in direction of the grain while said bolt is held in a vertical position; and, furthermore, to feed the bolt to the saw so that the butt of each alternate shingle shall be cut from the upper end of the bolt, and the thin end of each shingle alternating therewith shall be cut from the same end from which the butt of the preceding shingle was cut. It also has for its object certain inclined planes or cams for turning the feed-wheels, whereby the bolt is adjusted to the saw and a governing shaft or spindle, whereby the reciprocating movement of certain cam-slides are regulated as to the distance of their movement for operating the aforesaid cams; and, furthermore, the object thereof is to regulate the speed of the carriage of the machine, and for changing the feed of the same by the use of a friction cone-wheel operating on a driving-wheel arranged in relation therewith for that purpose. It also has for its object a certain rack pivoted to the carriage, whereby said carriage is moved, and to a certain strap-spring and roller for disengaging said rack from a feed-pinion arranged in combination therewith. It also has for its object certain other devices constituting the details of the machine, all of which are constructed, arranged, and operated in the manner as follows:

In the drawing, Fig. 1, Plate 1, A represents a frame, on which is mounted the carriage B, and which is made to slide backward and forward thereon upon the anti-friction rollers C, Figs. 3 and 4, by means of and for the purpose presently shown. In the front side of the carriage is journaled the dogging-roller D, Fig. 2, from the face of which projects a series of sharp rings of teeth, D', for holding the log or bolt, from which the shingles are cut. On the outer end of said roller is a feed-wheel, E, Figs. 2 and 4, in the teeth of which is made to engage the pawl F, as shown. Said pawl is operated for rotating the wheel E and roller thereto attached by the following devices: To the arm G, to which the pawl is pivoted, is secured a cam, H, Figs. 3 and 4, a detached view of which is shown in Fig. 7, Plate 5. In said Fig. 7 it will be seen that the lower edge of the cam slopes downward to the line I, from thence down to the line F'', making two inclined planes, 1 2, the purpose of which will hereinafter be shown. Also, in the lower part of the carriage B is fitted a cam-slide, J, Fig. 3, corresponding in size, construction, and operation to the cam-slide J', immediately above it, as shown in Figs. 1 and 3. In said cam-slide J is a slot corresponding to the slot $b$ in the cam-slide J'. In the slot of the slide J is received the lower edge or side of the cam H, and which slides therein as the cam-slide is actuated, as and for the purpose presently shown. Also, in said carriage B, is fitted, so as to slide therein, one end of a slotted sliding bar, K, Fig. 1, whereas the opposite end is secured in a stay, L, Figs. 1 and 2. Around the inner end of the bar is coiled a spring, M, Fig. 1. A detached view of said sliding-bar and spring is shown in Fig. 5, Plate 5. To the upper end of one side of the carriage is hinged a frame, N, Figs. 1 and 4. In the free end thereof is journaled a roller, O, Figs. 1 and 2, from the face of which projects a series of rings of sharp teeth, O', whereby the upper end of the bolt, from which the shingle is cut, is held in position and adjusted laterally to the saw. To one end of said dogging-roller is secured a feed-wheel, P, Figs. 1, 2, and 4, in the teeth of which is made to engage a pawl, Q, pivoted to the cam R, Figs. 1 and 2. Said cam is in size and shape similar to the cams H, above described, differing only in that it curves in the opposite direction. The cam is pivoted to the frame on a short shaft projecting from the side thereof, as shown at S, Figs. 1 and 3. The lower edge of the cam, which is also in shape the same as the cam H referred to, and as shown in Fig. 7, Plate 5, is received into the slot $b$ of the cam-slide J', and in which slot it slides in the same manner and for the same purpose as the cam H, as will presently be shown. The carriage above referred to is moved toward the saw T by means of a rack and pinion, U V, Figs. 2 and 5. Fig. 5, Plate 5, is a detached section. One end of the rack is hinged to the carriage by means of a link, W, Fig. 5, and partially shown in Fig. 3, whereas the opposite end is supported by a strap, A', Figs. 1 and 5, one end of the strap being attached to the rack at the point C, whereas the opposite end is carried over the roller B', thence to a hook, C', to which it is fastened. On the stem of said hook is coiled a spring, E', whereby the strap is drawn upon, thereby lifting the curved end of the rack upward, and in contact with the lower end of the lever F', as shown in Fig. 5, Plate 5, by which means the rack is disengaged from its connection with the pinion V, but which is made to engage therewith by pushing the lever F' to the position indicated by the dotted line e, Fig. 5, and as shown in Fig. 2, which, as a consequence, depresses the lower end of the lever, thereby forcing down the end of the rack and causing its engagement with the pinion aforesaid. It will be observed that the lever F' passes through the slot in the sliding bar K, and whereby the lever is operated at the proper time to engage the rack with the pinion. G', Fig. 3, is a spindle, the foot of which has its bearing in the frame A; whereas the upper end is journaled in the top of the standard H'. Near the upper end of the spindle is a pair of wings, I', Fig. 6, Plate 5, which represents a detached view of the spindle. Near the lower end of the spindle is also a pair of wings, J'', Figs. 3 and 6. Said wings project at right angle to the wings I'. Immediately below the wings J'' project four radial lugs, K', Figs. 2 and 6. The purpose of said wings and radial lugs will presently be shown. To the side of the carriage is loosely hung a pawl, L', Fig. 4, which is made to engage the radial lugs K' for rotating the spindle, as hereinafter shown. On the shaft M' carrying the pinion V of the rack is secured a friction-wheel, N', Fig. 3, the periphery of which is beveled, as shown in Fig. 1. On the face of said bevel-wheel runs a cone pulley or roller, O'', Fig. 4. Said roller is hung in the arm P', the arm being pivoted in the cheek of the stay Q', Fig. 1, on the shaft R', which is fitted loosely in the stay, so that it can slide laterally therein when actuated by the lever S', Fig. 4, connected therewith for that purpose. The frictional contact of the cone with the wheel is increased or lessened by the weight P'' suspended from the lever Q'', Fig. 2, said lever being attached to the bifurcated arm P' by a link, A'', Fig. 3.

By means of the cone and bevel-wheel just described the machine is driven. A belt from the saw-shaft to the cone drives the cone, which, in turn, by its frictional run upon the bevel-wheel, operates the machine, and which operation is as follows: A log, termed a bolt, of the proper length for a shingle is stood endwise between the dogging-rollers O D and clamped in this position by forcing down upon the end of the bolt the upper roller O by means of lever B'', Fig. 4, pivoted to an arm C'', and attached to the frame N by a link, E''. The lever on being pulled forward forces down the frame by means of the spring, thereby causing the dogging-roller to press hard upon the end of the bolt, and thus hold it firmly in position by the side of and in advance of the saw. The link C'' holds the lever erect, as shown in Fig. 4. The log is now fed to the saw by the forward movement of the carriage effected by the rack and pinion U V above described. The carriage having moved forward so far as is necessary is again drawn back by hand or by the weight F''. For this purpose the engagement of the rack U with the pinion is broken by lifting upward the free end of the rack by means of the strap A' and spring E'; thus the end of the rack is held down in contact with the pinion by means of the lever F'. When in the position shown in Fig. 2, the lower end of the lever presses down upon the rack, and holds it in its engagement with the pinion, and while thus engaged therewith the strap A' draws upon the rod surrounded by the spring E', by which means said spring is compressed between the head of the rod and side of the carriage. Now, when the carriage has nearly reached the end of its forward movement the lever F' is thrown back to the position shown in Fig. 5, by the end of the slot in the slide or bar K, which, at this time comes in contact with the lever, thereby throwing the lower end of the lever upward, which allows an upward movement of the free end of the rack, and which movement is effected by the reaction of the spring which causes the rod to draw upon the strap, and by means of the strap disengages the rack from the pinion, as above said, so that the carriage is now free to be drawn back by the weight F'' or by hand, as the case may be. The engagement of the rack with the pinion is again made by the lever F' coming in contact with a check, G'', Fig. 2, of which H'' is a handle, whereby said check can be turned up out of the way when so required. This contact of the lever with the check is caused by the backward movement of the carriage, and which is so timed as to take place immediately that the carriage is about to move forward again in order to feed the log to the saw, as before.

To assist in causing an immediate reaction or backward movement of the carriage at the instant that its forward movement is arrested the spring M, Figs. 1 and 5, is introduced and operates thus: As will be observed, said spring is coiled around the inner end of the slide or slotted bar K between the tension-nut c'', Fig. 5, on its extreme end and the side of the frame of the carriage, and through which the slide or bar passes and is held in position. The opposite end of the bar passes through an arm, L, which also holds that end of the slide in place. The carriage as it moves forward carries with it the slide until said slide is arrested by a pin, $a'$, inserted in its extreme rear end. Before the carriage reaches the end of its forward movement the pin comes in contact with the arm L, thereby causing the slide to remain while the carriage continues to move on. This, as a consequence, causes a compression of the spring M between the tension-nut $c''$ and the frame of the carriage the moment that the carriage is about to return in consequence of its rack being disengaged from the pinion in the manner as above described. The reaction of the spring M causes a sudden recoil of the carriage, thereby relieving it from a sharp sudden jar which would be the consequence of the dropping back of the weight $F''$, whereby the carriage is drawn back. The speed with which the log is fed to the saw is governed by the cone-pulley $o''$ referred to. The contact of the cone with the wheel, as shown in Fig. 1, is such as to cause a slow feed-motion; to increase which the cone is forced further upon the wheel, and that more or less as the speed required may demand, and which adjustment of the cone in its relation to the wheel is done by the lever S, heretofore described. The degree of friction that the wheel and cone have upon each other is regulated by the weight $P''$; thus, if a strong feed-power is required, the weight is moved near to the end of the lever, and so per contra. A large and a small log will require a difference in the distance that the carriage should travel. This difference, for the purpose specified, is obtained by the stops 1 2 3 4 5, Figs. 1 and 2. Said stops are hung on a shaft supported by the standard $R''$. The length that the carriage can travel, as shown in Fig. 2, is that of the greatest extent; hence the largest-size log practicable can be sawed through. Logs of smaller diameter will not require that the carriage should travel so far in order to be sawed through; hence, to save time and avoid unnecessary travel of the carriage, the stops referred to are used. In Fig. 1 the stop 5 is shown as being turned over onto the slide or bar K between the pin $a'$ and the arm L. It will be obvious that as the carriage moves forward the pin $a$ will strike against the stop instead of against the arm L, as in the former instance, thereby preventing the carriage from moving so far forward as before. This shortening of the movement of the carriage is equal to the thickness of the one stop, and so on for the whole number of them or as many as the size of the log to be sawed may require. While the distance that the carriage may move forward is regulated by the several stops referred to, they in no way affect its return movement, as the distance that the carriage moves back must be for every size log the same, viz., so far as to bring the side of the log in front of the saw. In the event it may be required to dispense with the use of the rack and pinion for moving the carriage and operate it wholly by hand the stop $G''$ can be turned up out of the way so that it will not actuate the lever $F'$, in the manner and for the purpose above said; hence the rack will be continued elevated above the pinion by the tension of the spring $E'$ allowing the carriage to run free thereof in either direction. The log or bolt is adjusted to the saw laterally for the thickness of the shingle by rotating the dogging-rollers O D, above described, and which are operated by the pawls Q F. Said pawls are attached to the cams R H—the pawl Q to the cam R, and the pawl F to the cam H.

Now, on drawing back the carriage for another cut, the log is advanced laterally toward the saw by the end of the cam-slide or bar $J'$ striking against one side of the spindle $G'$, Fig. 2, which at this time is turned toward the slide or bar, as shown in said Fig. 2. The slide by this means is pushed back as the carriage advances, thereby bringing the end of the slot $b$ in the slide to the slope of the cam R, which, in consequence, will be pushed up out of the slot, as shown in Fig. 2. The upward movement of the cam draws upon the pawl Q, attached thereto, and as a consequence rotates the wheel P, one notch or tooth thereby turning the dogging-roller, which will advance the upper end of the log before the saw a distance equal to the thickness of the thin end of the shingle. At or about the same time the lower cam-slide J, Fig. 3, arranged in the lower part of the carriage and in a corresponding relation to the upper cam-slide, strikes against one of the projecting wings $J''$ of the spindle, which at this time of the operation of the machine projects out toward the cam-slide, as shown in Fig. 3. The slide, by its contact with the wing, is pushed forward, as were the upper cam-slides, and which in the same manner will push upward the cam H, thereby operating the pawl F attached thereto, which in consequence will rotate the wheel E three notches or teeth, thereby turning the lower dogging-roller D, which will advance the lower end of the bolt before the saw a distance equal to the thickness of the butt of the shingle.

It will be seen that by this combined and simultaneous movement of the two cams and cam-slides the log is adjusted in its relation to the saw immediately that the carriage is so far drawn back as to bring the log in advance of it, and that the upper end of the log is moved in front of the saw just so far as is required for the thin end of the shingle, and that the lower end of the log is moved at the same time just so far as is required for the thickness of the butt. In this position of the bolt to the saw the carriage is again pushed forward and a shingle cut therefrom.

The moment that the carriage starts forward the spindle $G'$ is caused to turn a quarter around, or from its position shown in Figs. 2 and 3 to that shown in Fig. 6, in which it will be seen that one of the wings, $I'$, stands toward the cam-slide, and which is also indicated by the dotted lines *m*, Fig. 2. The wing J'', at the lower end of the spindle which stood toward the lower cam-slide, is now turned away from it, so that the side of the spindle is presented to the end of the cam-slide instead of the wings, this turning of the spindle changing the position of the upper and lower wings thereof in their relation to the cam-slides, thereby presenting one of the upper wings, I', to the upper cam-slide instead of the side of the spindle, and the side of the spindle to the lower cam-slide, instead of to the wing, is effected by the pawl L', Fig. 4, pivoted to the side of the carriage, which, on being drawn back, the pawl slips over one of the radial lugs K' and falls upon the opposite side, as shown in said Fig. 4. Now, as the carriage starts forward, the pawl L' will be caught by the lug K', but which cannot swing back, as it is prevented by the pin *r*, Fig. 4; hence the engagement of the pawl with the lug will rotate the spindle one quarter of the way round, thereby changing the relative position of the wings to the cam-slides, as above described. This changing of the position of the spindle and the wings thereof is for the purpose of securing a differential movement of the dogging-rollers in relation to each other—that is to say, to cause the upper roller to rotate the distance of one notch of the wheel P, and the lower roller to rotate the distance of three notches at the same time, and reversely to cause the lower roller to rotate the distance of one notch instead of three and the upper roller to rotate the distance of three notches instead of one. This alternating movement of the distance of the two rollers is for the purpose of adjusting the bolt to the saw, so that the butt of one shingle shall be cut from the upper end of the bolt and the butt of the next in order from the lower end thereof, by which means the bolt is held and continued in an upright position and at the same time gives the taper to the shingle as they are sawn, but which could not be done were both ends of the bolt moved the same distance at once.

The operation of the devices for accomplishing this alternating adjustment of the bolt is as follows: The position of the spindle G' in its relation to the cam-slides, as shown in the drawing, is such as to cause the rotation of the roller one notch of the wheel P, and that of the roller D three notches of the wheel E, which will cut a shingle butt-end down, as above described. It will be obvious that when the flat side of the wings I' is presented to the cam-slide, the distance that the slide will be forced back by contact therewith will be less than it would be if the edge of the wing were presented instead. When the flat side of the wings is presented the slide is forced back only so far as the first incline 1, Fig. 7, of the cam, which will lift it far enough to allow the straight part I of the cam to fall upon the slide, and this will rotate the wheel one notch; also the dogging-roller therewith. Now, when a wing is presented to the bar, as indicated by the dotted lines *m*, Fig. 2, the slide will be pushed further back, or so far as to cause the second incline, No. 2, of the cam to ride upon the end of the slot in the slide and rest on the straight part F'', Fig. 7, which will give a three-notch turn to the dogging-roller. The lower cam-slide is operated in the same way and at the same time, both cams having double inclines, and which are essentially, in construction and operation, the same. Thus, when a lower wing of the spindle is presented to the lower slide the flat side of the upper wings will be presented to the upper slide. At this time a shingle will be cut butt-end downward. Now, on the return of the carriage for another cut, the position of the spindle will have been changed so as to present an upper wing to the slide instead of the flat side, and the flat side of the lower wings will be presented to the lower slide instead of the wing, so that the shingle now cut will be butt-end upward instead of downward, as in the former instance, and so on, alternately, from time to time, as the carriage may be drawn back and pushed forward, a shingle will be cut butt-end up in one instance and reversely in the next. The spindle may be operated by hand by means of the button S', which sometimes may be desirable. Said spindle is held in any one position by a spring, T', Fig. 1, so that it is not too easily rotated, or liable to be so out of time for the general movement of the machine.

Claims.

What I claim as my invention, and desire to secure by Letters Patent, is—

1. The cams H R, constructed with double-inclined planes, as described, and arranged in combination with cam-slides J J', in the manner substantially as described, and for the purpose set forth.

2. The cams H R and pawls Q F, as arranged in relation to each other and in combination with the wheels P E and dogging-rollers O D, operating substantially in the manner, as and for the purpose set forth.

3. The spindle G', having wings I', J'', and lugs K', in combination with the cam-slides J J' and pawl L', substantially as described, and for the purpose specified.

4. The sliding rod K and spring M, in combination with the carriage B, in the manner as, and for the purpose set forth.

5. The series of stops 1 2 3 4 5, as arranged in combination with the sliding rod K, as and for the purpose specified.

6. The adjustable frictional cone-pulley O'', in combination with the beveled wheel N', as and for the purpose specified.

7. The bell-crank shifting-lever S', lever Q'', and weights F'' P'', in combination with the arm P', carrying the frictional cone O'', for the purpose set forth.

8. The pivoted rack-bar U, as arranged, in combination with the carriage B, lever F', and pinion V, substantially in the manner as, and for the purpose set forth.

9. The belt A', hook C', and spring E', in combination with the rack U, in the manner as, and for the purpose specified.

10. The lever F' and stop or check G'', as arranged, in combination with the pivoted rack U, substantially in the manner as and for the purpose set forth.

11. The lever B'', link E'', and spring C'', as arranged, in combination with the frame N, in the manner as and for the purpose specified.

JERRY R. HALL.

Witnesses:
JOHN H. BURRIDGE,
A. F. CORNELL.